US006053740A

United States Patent [19]

Nakata et al.

[11] Patent Number: 6,053,740

[45] **Date of Patent: *Apr. 25, 2000**

[54] LYRICS DISPLAY APPARATUS

[75] Inventors: Takuya Nakata; Yasushi Kurakake, both of Hamamatsu, Japan

[73] Assignee: Yamaha Corporation, Hamamatsu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/738,084

[22] Filed: Oct. 25, 1996

[30] Foreign Application Priority Data

Oct. 25, 1995 [JP] Japan .................................... 7-302025

[51] Int. Cl.[7] ................................ G10H 1/36; G09B 5/00

[52] U.S. Cl. ................................ 434/307 A; 434/307 R; 345/141; 84/609

[58] Field of Search ....................... 434/118, 307 R–309, 434/318, 365; 84/477 R, 601–611, 615, 634–637, 644, 650–652, 662; 369/47, 50, 32, 48; 360/32, 33.1, 77.01; 345/127–130, 136, 141, 147; 348/571, 595, 738, 478, 484, 589; 381/61; 386/96, 97

[56] References Cited

U.S. PATENT DOCUMENTS

| | | | |
|---|---|---|---|
| 5,208,413 | 5/1993 | Tsumara et al. | 434/307 A |
| 5,233,438 | 8/1993 | Funahashi et al. | 386/97 |
| 5,247,126 | 9/1993 | Okamura et al. | 434/307 A |
| 5,494,443 | 2/1996 | Nakai et al. | 434/308 X |
| 5,499,921 | 3/1996 | Sone | 434/307 A |
| 5,568,167 | 10/1996 | Galbi et al. | 348/589 |
| 5,589,947 | 12/1996 | Sone et al. | 386/96 |
| 5,634,798 | 6/1997 | Suh | 84/610 X |
| 5,683,253 | 11/1997 | Park et al. | 434/307 A |
| 5,768,396 | 6/1998 | Sone | 381/61 |
| 5,770,811 | 6/1998 | Haino | 84/477 R |
| 5,803,747 | 9/1998 | Sone et al. | 84/609 X |

FOREIGN PATENT DOCUMENTS

| | | | |
|---|---|---|---|
| 3-6731 | 1/1991 | Japan . | |
| 5-142985 | 6/1993 | Japan | 434/307 A |
| 5-242082 | 9/1993 | Japan . | |

*Primary Examiner*—Joe H. Cheng
*Attorney, Agent, or Firm*—Graham & James LLP

[57] ABSTRACT

A lyrics display apparatus for indicating the words of a song on a screen of a display device, which is designed to memorize a lyrics data including a first line-change code for defining a predetermined number of words to be indicated on one line and a second line-change code for defining a segmental position of the words indicated on the line, to set a first display mode when the screen of the display device is able to indicate the number of words defined by the first line-change code on the one line, to set a second display mode when the screen of said display device is unable to indicate the number of words defined by the first line-change code on the one line, to control the display device in such a manner that the words defined by the first line-change code are indicated on the one line at the first display mode and that the line of the words defined by the first line-change code is changed to another line at the segmental position defined by the second line-change code at the second display mode.

14 Claims, 4 Drawing Sheets

| | |
|---|---|
| TIME DATA | TD1 |
| PERFORMANCE EVENT DATA | PE1 |
| TIME DATA | TD2 |
| LYRICS EVENT DATA | LE1 |
| TIME DATA | TD3 |
| PERFORMANCE EVENT DATA | PE2 |
| TIME DATA | TD4 |
| LYRICS EVENT DATA | LE2 |
| . . | |

*Fig.3*

| | | | | | | | | | |
|---|---|---|---|---|---|---|---|---|---|
| あ | い | う | え | お% | か | き | く | け | こ／ |
| さ | し | す | せ | そ% | た | ち | つ | て | と# |

*Fig.4*

あいうえお
かきくけこ
さしすせそ
たちつてと

*Fig.5*

あいうえおかきくけこ
さしすせそたちつてと

LYRICS DISPLAY APPARATUS

BACKGROUND OF THE INVENTION

1. Field of the Invention

The present invention relates to a lyrics display apparatus adapted for use in Karaoke equipments, and more particularly to a lyrics display apparatus capable of changing an indicated line of the words of a song to another line at a predetermined position.

2. Description of the Prior Art

A conventional lyrics display apparatus adapted for use in Karaoke equipments is provided with a display device such as a cathode-ray tube or CRT which is designed to indicate thereon the words of a song in accordance with memorized lyrics data. The lyrics data is memorized in the form of a predetermined phrase unit the segmental position of which is adapted to change an indicated line of the words of a song to another line. Since in the conventional lyrics display apparatus, an indicated line of the words of a song is changed to another line at each segmental position of phrases, the words of one phrase would not be indicated on one line if a lyrics data produced for use in a specific display device was adapted to another display device. That is to say, if a lyrics data produced for indicating the words of a song on a large screen of a display device such as cathode-ray tube or CRT was utilized to indicate the words of the song on a small screen of a liquid crystal display device, the words of the song would not be indicated on one line. In such a case, if the words of the song were indicated in the form of small characters on the one line, the display device would become useless due to illegible indication of the words. On the contrary, if a lyrics data produced for indicating the words of a song on a small screen was utilized to indicate the words of the song on a large screen, the indication of the words would become illegible due to frequent change of an indicated line of the words. For these reasons, common use of the lyrics data may not be realized.

SUMMARY OF THE INVENTION

It is, therefore, a primary object of the present invention to provide a lyrics display apparatus wherein a lyrics data can be utilized in common to a large screen display device and a small screen display device without causing the problems discussed above According to the present invention, the object is accomplished by providing a lyrics display apparatus for indicating the words of a song on a screen of a display device, which comprises memory means for memorizing a lyrics data including first and second line-change codes, the first line-change code being memorized to define a predetermined number of words to be indicated on one line, and the second line-change code being memorized to define a segmental position of the words indicated on the one line, display mode setting means for setting a first display mode when the screen of the display device is able to indicate the number of words defined by the first line-change code on the one line and for setting a second display mode when the screen of the display device is unable to indicate the number of words defined by the first line-change code on the one line, and control means for controlling the display device in such a manner that the words defined by the first line-change code are indicated on the one line at the first display mode and that the line of the words defined by the first line-change code is changed to another line at the segmental position defined by the second line-change code at the second display mode

BRIEF DESCRIPTION OF THE DRAWINGS

Other objects, features and advantages of the present invention will be more readily appreciated from the following detailed description of a preferred embodiment thereof when taken together with the accompanying drawings, in which:

FIG. 3 illustrates a portion of contents of a track chunk in memorized performance data;

FIG. 4 illustrates an example of the words of a song indicated on a small screen of a display device;

FIG. 5 illustrates an example of the words of the song indicated on a large screen of another display device;

DESCRIPTION OF THE PREFERRED EMBODIMENT

Figures 1, 2:
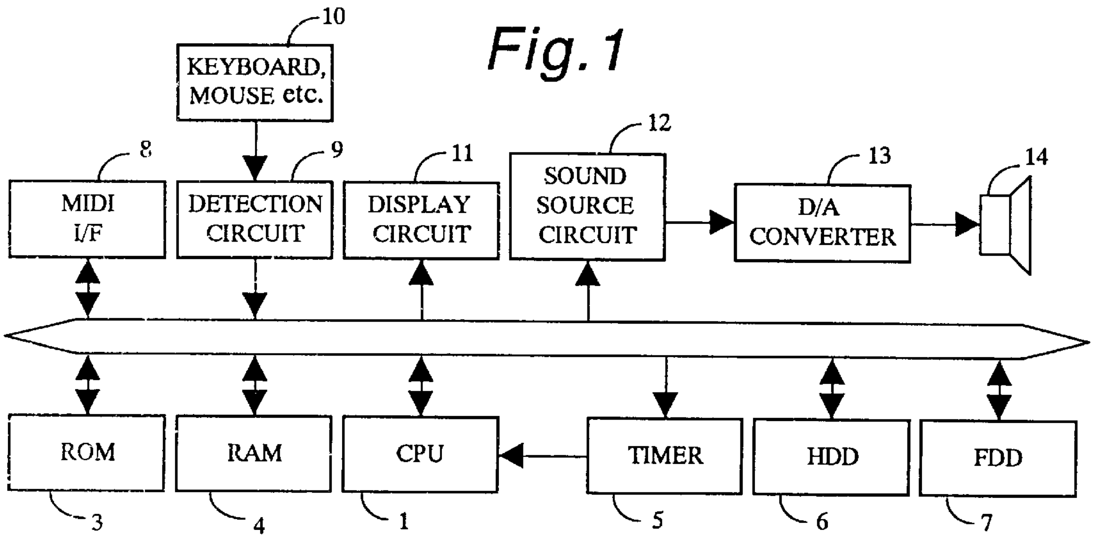
FIG. 1 is a block diagram of a lyrics display apparatus in accordance with the present invention.
FIG. 2 is a memory format of a performance data used in the lyrics display apparatus.

A preferred embodiment of the present invention will be described with reference to FIGS. 1 to 7 of the drawings. Illustrated in FIG. 1 is a block diagram of a lyrics display apparatus which includes a central processing unit or CPU 1 arranged to execute a control program memorized in a read-only memory or ROM 3. The CPU 1 is connected to other component parts through a bus line 2. The lyrics display apparatus further includes a random access memory or RAM 4 which is provided with memory regions such as a buffer, a register and the like for temporarily memorizing various kinds of data applied from the CPU 1 during execution of the control program and further provided with memory regions for memorizing a performance data applied from a hard disk device or HDD 6 or a floppy disk device or FDD 7. The performance data includes a performance event data for accompaniment of a Karaoke equipment and a lyrics event data for indicating the words of a song. A timer 5 is provided to supply an interruption signal to the CPU 1 at a predetermined time interval. The performance data memorized in the RAM 4 is read out by the CPU 1 during interruption processing conducted at the predetermined time interval.

A musical instrument digital interface or MIDI I/F 8 is connected to the bus line 2 to be applied with the performance data from an external device (not shown). For example, when applied with the performance data from the external device. the MIDI I/F 8 causes the HDD 6 to memorize the performance data. Operation elements 10 such as a keyboard or a mouse are provided to designate various kinds of functions such as start/stop of the performance. Operation of the operation elements 10 is detected by a detection circuit 9, and the operation information is supplied to the CPU 1 through the bus line 2. When applied with the operation information, the CPU 1 executes the various kinds of functions in accordance with the operation information. A display circuit 11 is provided to indicate the words of a song for Karaoke on a liquid crystal display device with a small screen (not shown) or a cathode-ray tube or CRT device with a large screen (not shown). In this embodiment, the lyrics display apparatus is provided with only the liquid crystal display device and is arranged to be connected to the CRT device or selectively connected to plural kinds of display devices different in screen size.

A sound source circuit 12 is provided to produce a musical tone waveform signal based on the performance event data applied thereto from the CPU 1. The sound source circuit 12 is in the form of a waveform memory readout system, a frequency modulation or FM system, a physical model simulation system, a higher harmonics synthesis system, a formant synthesis system, an analog synthesizer system in combination with an oscillator and a filter or the like. The musical tone waveform signal produced by the sound source circuit 12 is converted into an analog musical tone waveform by means of a digital-to-analog or D/A converter 13 and is generated as a musical sound at a sound system 14. In a practical embodiment of the present invention, the sound source circuit 12 may be in the form of a digital signal processor or DSP in combination with a microprogram or another sound source circuit in which a plurality of sound channels are formed by using a single circuit in time division or a single sound channel is formed by a single circuit. Alternatively, the sound source 12 may be connected to an external device by means of a communication system such as various kinds of communication networks.

Illustrated in FIG. 2 is a memory format of the performance data memorized in the RAM 4. For example, the performance data is being memorized in the form of a standard MIDI file or SMF. FIG. 3 illustrates a part of contents of a track chunk in the memorized performance data, wherein time data TD1, TD2 . . . represent a time interval for reproduction of an event data and the following event data and are prescribed as a predetermined note length (for instance, 384th note) in a unit value. In the memory format, the performance event data PE1, PE2, . . . are applied to perform accompaniment of the Karaoke. The performance event data each includes various kinds of control data such as a note-on or note-off event data, a pitch bend data, a tone volume data and the like. The note-on or note-off event data includes a key-code data representing a tone pitch of a musical tone to be sounded or muted. The performance event data further includes a performance data for a plurality of parts such as a drum part, a bass part, a chord backing part, a melody part or the like. These parts are identified by each channel number included in the performance event data.

The lyrics event data LE1, LE2, . . . each are in the form of a meta-event data applied to indicate the words of a song. In this embodiment, one of the lyrics event data corresponds with one word of the song, and the lyrics event data each are memorized in pair with a performance data of the corresponding melody. For example, a word represented by the lyrics event data LE1 corresponds with a note represented by the performance event data PE1, and the time data TD2 between the two event data PE1 and LE1 is set as "0" so that the two event data PE1 and LE1 are simultaneously produced. As shown in FIG. 3, various kinds of control codes may be included in the lyrics event data LE1, LE2 . . . in necessity. In FIG. 3, a portion defined by a pair of vertical segmental lines represents one of the lyrics event data. That is to say, the characters "あ". "い", "う", "え", "お%" each represent one event of the lyrics. The character "/" represents a line-change code, and an Indicated line of the words of a song are changed to another line at a position defined by the line-change code. The character "%" represents an ancillary line-change code which is memorized in a position or plural positions between a line-change code and the following line-change code. The ancillary line-change code is used in accordance with an indication ability of the display device or the number of words indicated on one line. In use of the ancillary line-change code, an indicated line of the words of the song is changed to the following line at a position defined by the ancillary line-change code "%". The character "#" represents a page-change code, and an indicated page of the lyrics is changed to the following page at a position defined by the page-change code. Thus, the words of the song between a page-change code and the following page-change code are indicated on one page.

The line-change code "/" is memorized at each segment of a predetermined phrase or each at a predetermined number of words to determine a maximum number of words in one phrase. Accordingly, when the display device is designed to indicate the predetermined number of words on one line, the words of the song defined by the line-change code can be indicated within the one line. On the other hand, the ancillary line-change code is frequently included in the lyrics data more than the line-change code. For example, when the line-change code is included in the lyrics data every forty words, the ancillary line-change code is included in the lyrics data every twelve words. That is to say, the phrase segmentalized by the line-change code is further divided by the ancillary line-change code into more than two short phrases. When the phrase is segmentalized by the line-change code and ancillary line-code, the maximum number of words in the segmentalized phrase is not limited as in the example described above. When the number of words defined by the line-change codes is small, it is not necessary to include the ancillary line-change code in the lyrics data.

Illustrated in FIG. 4 is the lyrics event of FIG. 3 indicated on a small screen display device where a small number of words can be indicated on one line. In the lyrics event shown in FIG. 4, the first line is changed to the following line at each position of "お" and "こ" respectively defined by the ancillary line-change code "%" and the line-change code "/", and the second line is changed to the following line at each position of "ね" and "と" respectively defined by the ancillary line-change code "% " and the page-change code "#". Illustrated in FIG. 5 is the lyrics event of FIG. 3 indicated on a large screen display device where a large number of words can be indicated on one line. In the lyrics event shown in FIG. 5. the first line is changed to the second line at the position of "こ" defined by the line-change code "/" without being changed at the position of "お" defined by the ancillary line-change code "%", and the second line is changed to the following line (not shown) at the position of "と" defined by the page-change code "#" without being changed at the position of "ね" defined by the ancillary line-change code "%".

In a practical embodiment of the present invention, the memory format of the performance data may be modified in the form of "Event+Absolute time", "Tone pitch+Note length" or the like. The performance event data and the lyrics event data in the memory format may be separately memorized in different regions in such a manner as to determine each reproduction timing of the words of the song. The performance data may be also memorized in such a manner that the data of plural parts are separately memorized in each track.

Figure 6:
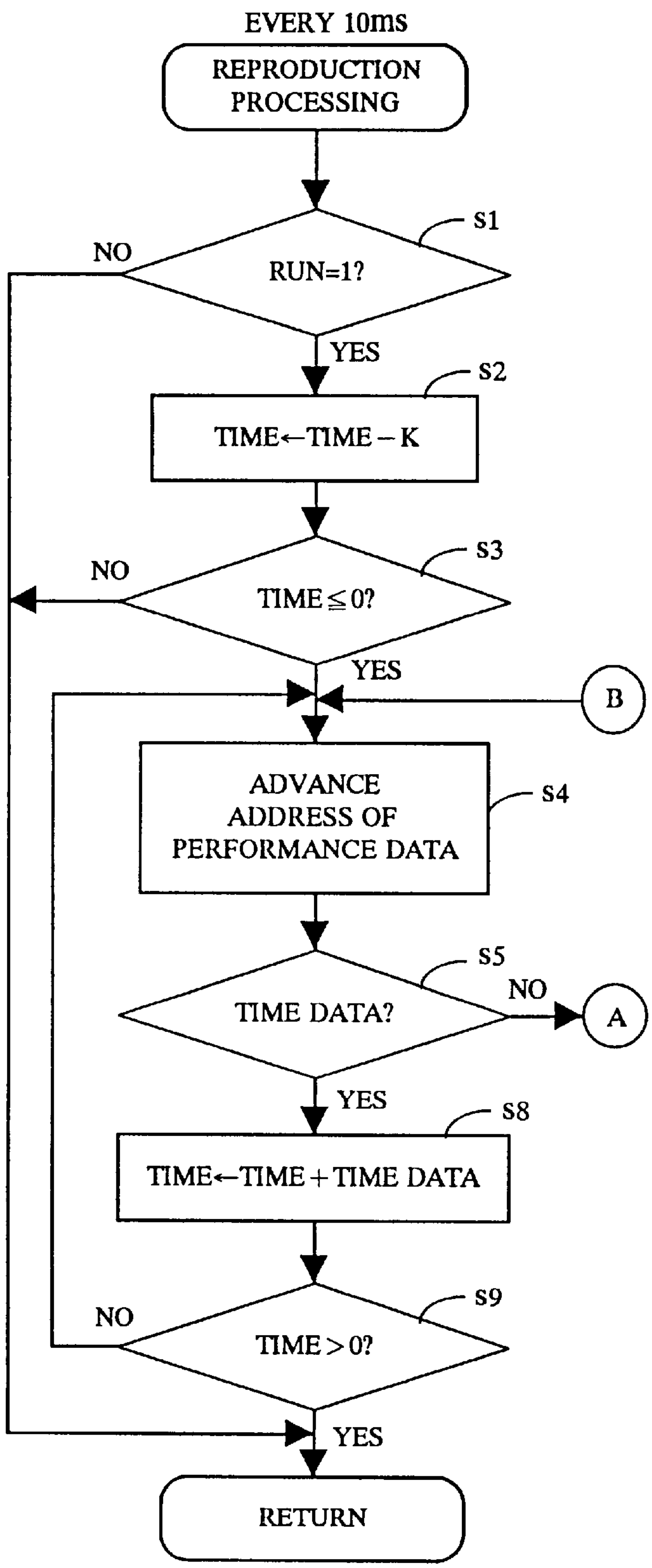
FIG. 6 is a flow chart of a first part of a reproduction program executed by a central processing unit or CPU shown in FIG. 1.
Figure 7:
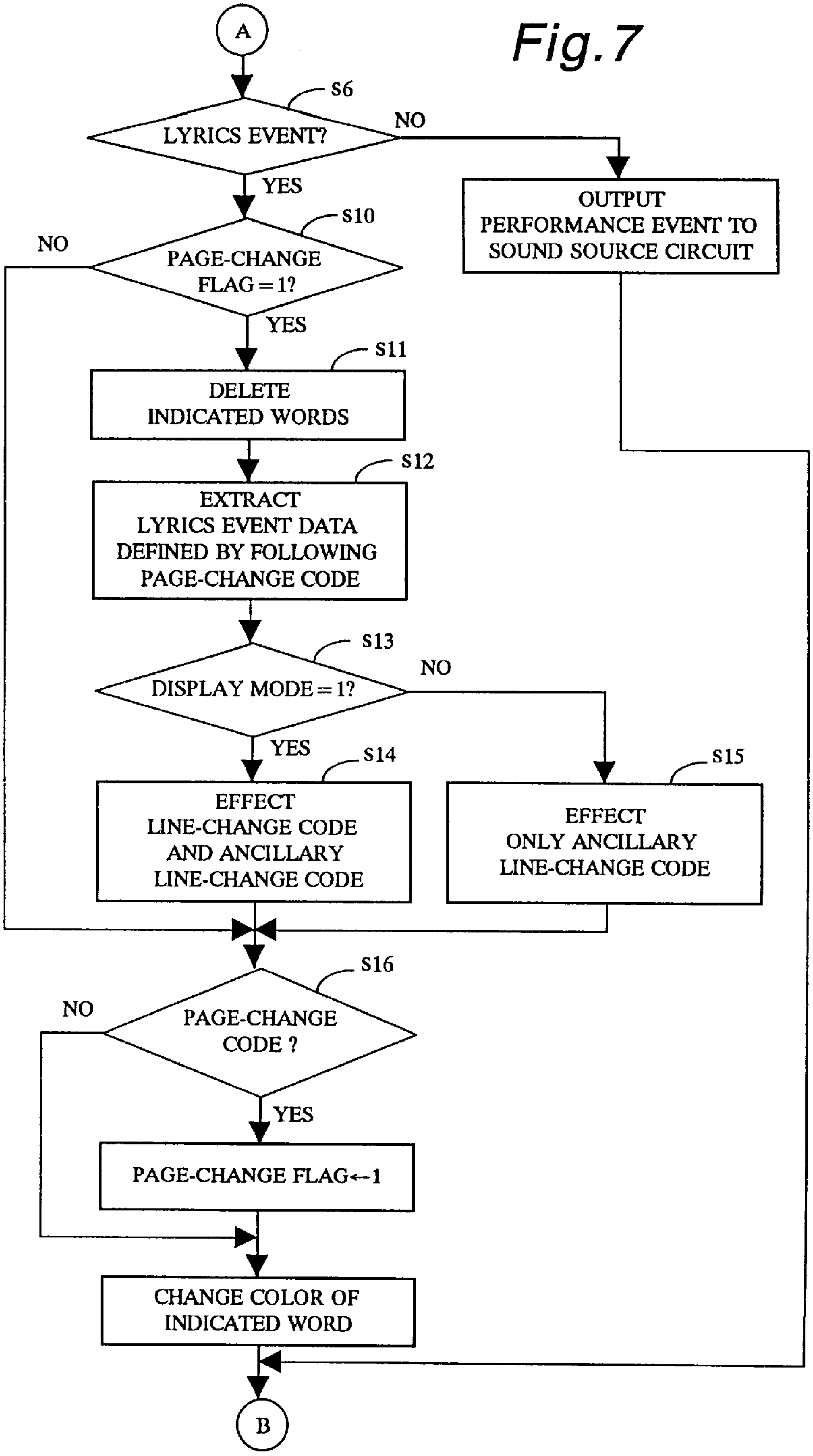
FIG. 7 is a flow chart of a second part of the reproduction program.

In FIGS. 6 and 7 there is illustrated a reproduction program which is executed by the CPU 1 in response to an interruption signal applied from the timer 5 at a time interval of 10 ms. Assuming that a flag RUN has been set as "1" in response to an instruction for performance start, the CPU 1 determines a "Yes" answer at step s1 and executes processing for performing accompaniment of Karaoke and for indicating the words of a song. When determined a "No" answer at step s1, the CPU 1 returns the program to a main routine (not shown). When the program proceeds to step s2, the CPU 1 subtracts a predetermined value K from a register TIME for storing a time data. In this embodiment, the predetermined value K is defined to correspond with a unit note length to be advanced in a period of time 10 ms. The predetermined value K is represented by the following equation:

$$K = \frac{(\text{Tempo} \times \text{Resolution} \times \text{Interruption period})}{(60 \times 1000)}$$

where the tempo is the number of quarter notes performed in one minute, and the resolution represents the number of quarter notes Included in the time data of the performance data. For example, when a 384th note is prescribed as a unit in the time data, the resolution is defined as "96" since the 384th note is divided by the quarter note into 96. The interruption period is the occurrence period of the interruption signal for execution of the reproduction program. In this embodiment, the interruption period is defined as 10 ms. Assuming that the tempo is 120, the resolution is 96 and the interruption period is 10 ms, the value K is defined as 1.92. Thus, the time data is advanced by 1.92 in each execution of the reproduction program. Assuming that the value of the time data is 192 (corresponding with a half note length), performance of a half note is advanced by one hundred times execution of the reproduction processing. In other words, the reproduction tempo can be changed by variation of the value of K. Alternatively, the performance tempo may be adjusted by change of the period of the reproduction processing or correction of the time data. The initial value of the register TIME is defined by the first time data in the performance data during processing executed in response to the performance start instruction.

When the value of the register TIME becomes less than "0", the CPU 1 determines a "Yes" answer at step s3 and advances the address of the performance data at step s4 to read out the memorized data therefrom. At the following step s5, the CPU 1 determines whether the read out data is the time data or not. Since the heading time data is read out already at start of the performance, the following event data is read out at step s4. Thus, the CPU 1 determines a "No" answer at step s5 and causes the program to proceed to step s6 shown in FIG. 7. At step s6, the CPU 1 determines whether the read out data is the lyrics event data or not. If the read out data is the performance event data, the CPU 1 determines a "No" answer at step s6 and applies the performance event data to the sound source circuit to effect sound or mute of the accompaniment tone. If the answer at step s6 is "Yes", the CPU 1 determines at step s10 whether a page-change flag is set as "1" or not. In this embodiment, the page-change flag is used to change an indicated page to the following new page.

If the page-change flag is set as "1", the CPU 1 deletes indicated words of a song at step s11 to indicate the words of the song on the following new page and extracts all the lyrics event data defined by the following page-change code at step s12 to produce the following lines of the words of the song for the following new page. At the following step s13, the CPU 1 determines whether a display mode is set as "1" or not. The display mode is used to make the ancillary line-change code effective or ineffective. When the display mode is set as "1", the CPU 1 makes the ancillary line-change code effective. When the display mode is set as "2", the CPU 1 makes the ancillary line-change code ineffective. For example, the display mode is set as "1" when the words of the song are indicated on the small screen of the liquid crystal display device, and the display mode is set as "2" when the words of the song are indicated on the large screen of the CRT display device. The display mode is manually set by a user or automatically set when the display circuit 11 is connected to an external CRT display device.

When the display mode is set as "1", the CPU 1 determines a "Yes" answer at step s13 and makes at step s14 both the line-change code and ancillary line-change code effective. Thus, the CPU 1 outputs the word lines to be changed at each position defined by the line-change code and ancillary code and resets the page-change flag. When the display mode is set as "2", the CPU 1 determines a "No" answer at step s13 and makes at step s15 only the line-change code effective. In this instance, the CPU 1 outputs the word lines to be changed at a position defined by the line-change code and resets the page-change flag. At the following step s16, the CPU 1 determines whether the page-change code is included in the read out lyrics event data or not. If the answer at step s16 is "Yes", the CPU 1 sets the page-change flag as "1" at step s17. The page-change flag set as "1" at this stage is used at step s10 to indicate the words of the song on the following new page when the following lyrics event data is read out.

When the program proceeds to step s18, the CPU 1 changes the color of one word corresponding with the currently read out lyrics event data to inform a singer of a progress position of the lyrics. In this instance, the color of the word may be gradually changed in accordance with progression of the lyrics. Alternatively, the font, size or background color of the word may be changed to inform the singer of a progress position of the lyrics. The word may be also underlined or framed in accordance with progression of the lyrics.

When finished execution of the program shown in FIG. 7, the CPU 1 returns the program to step s4 to advance the address of the performance data for reading out the following data. Since the time data is memorized next to the event data, the CPU 1 determines a "Yes" answer at step s5 and adds the read out time data to the register TIME at step s8, When the value of the register TIME becomes a positive value as a result of addition of the time data, the CPU 1 returns the program to the main routine and finishes the reproduction processing. When the performance event data and lyrics event data continue or a performance event data corresponding with a chord exists, the time data becomes zero or approximately zero. In such an instance, the CPU 1 determines a "No" answer at step s9 and repeats the processing at s4 to s9.

In practical embodiments, the present invention can be adapted for use in an electronic musical instrument, a Karaoke equipment, a personal computer in combination with an application software or the like. The lyrics event data may be memorized in the form of a word line data of lyrics and each reproduction timing data of the words, and the display of the lyrics may be arranged to indicate the words of a song on one line. The lyrics event data may be memorized without any combination with the performance data to indicate only progression of a musical tune.

Although in the embodiment described above, the display mode has been manually switched over by a user or automatically switched over when the display circuit was connected to the CRT display device, the display mode may be switched over in accordance with the number of words on one line indicated on the screen of another display device connected to the display circuit 11. The line-change code may be determined in more than three kinds.

The word size may be changed In accordance with the screen size of the display device. In such a case, the present invention is useful to decrease the change amount of the word size when the display circuit 11 is connected to another small screen display device from a large screen display device. Furthermore, the ancillary line-change code may be arranged to be effective only when the words of a song may not be indicated on one line. In other words, the ancillary line-change code may be arranged to be ineffective when the words of a song can be indicated on one line in use of a display device with a small size screen.

What is claimed is:

1. A lyrics display apparatus for indicating the words of a song on a screen of a display device, comprising:

memory means for memorizing a lyrics data including first and second line-change codes, said first line-change code being memorized to define a predetermined number of words to be indicated on one line, and said second line-change code being memorized to define a segmental position of the words indicated on the one line;

display mode setting means for setting a first display mode when the screen of said display device is able to indicate the number of words defined by said first line-change code on the one line and for setting a second display mode when the screen of said display device is unable to indicate the number of words defined by said first line-change code on the one line; and control means for controlling said display device in such a manner that the words defined by said first line-change code are indicated on the one line at said first display mode and that the line of the words defined by said first line-change code is changed to another line at the segmental position defined by said second line-change code at said second display mode.

2. A lyrics display apparatus as recited in claim 1, wherein said first line-change code is memorized at each segment of a predetermined phrase.

3. A lyrics display apparatus as recited in claim 1, wherein said first line-change code is memorized each at a predetermined number of words to determine a maximum number of words to be indicated within one line.

4. A lyrics display apparatus as recited in claim 1, wherein said display mode setting means is operated by a user to selectively set either one of said first and second display modes in accordance with a screen size of said display device.

5. A lyrics display apparatus as recited in claim 1, wherein said display mode setting means is automatically operated to selectively set either one of said first and second modes when connected to an external display device.

6. A lyrics display apparatus as recited in claim 1, wherein said display mode setting means is operated to selectively set either one of said first and second display modes in accordance with the number of words on one line indicated on the screen of said display device.

7. A machine readable media containing a program to cause a processor to perform the steps of:

memorizing a lyrics data including a first line-change code for defining a predetermined number of words to be indicated on one line and a second line-change code for defining a segmental position of the words indicated on the line;

setting a first display mode when a display device is able to indicate the number of words defined by said first line-change code on the one line;

setting a second display mode when the display device is unable to indicate the number of words defined by said first line-change code on the one line; and controlling the display device in such a manner that the words defined by said first line-change code are indicated on the one line at said first display mode and that the line of the words defined by said first line-change code is changed to another line at the segmental position defined by said second line-change code at said second display mode.

8. A lyrics display apparatus for indicating the words of a song on a screen of a display device, comprising:

a program memory which memorizes a lyrics data including first and second line-change codes, said first line-change code being memorized to define a predetermined number of words to be indicated on one line, and said second line-change code being memorized to define a segmental position of the words indicated on the one line;

a display mode setting device which is arranged to set a first display mode when the screen of said display device is able to indicate the number of words defined by said first line-change code on the one line and to set a second display mode when the screen of said display device is unable to indicate the number of words defined by said first line-change code on the one line; and a central processing unit associated with said program memory to control said display device in such a manner that the words defined by said first line-change code are indicated on the one line at said first display mode and that the line of the words defined by said first line-change code is changed to another line at the segmental position defined by said second line-change code at said second display mode.

9. A lyrics display apparatus as recited in claim 8, wherein said first line-change code is memorized at each segment of a predetermined phrase.

10. A lyrics display apparatus as recited in claim 8, wherein said first line-change code is memorized each at a predetermined number of words to determine a maximum number of words to be indicated within one line.

11. A lyrics display apparatus as recited in claim 8, wherein said display mode setting device is operated by a user to selectively set either one of said first and second display modes in accordance with a screen size of said display device.

12. A lyrics display apparatus as recited in claim 8, wherein said display mode setting device is automatically operated to selectively set either one of said first and second modes when connected to an external display device.

13. A lyrics display apparatus as recited in claim 8, wherein said display mode setting device is operated to selectively set either one of said first and second display modes in accordance with the number of words on one line indicated on the screen of said display device.

14. A method for indicating the words of a song on the screen of a display device, comprising the steps of:

memorizing a lyrics data including a first line-change code for defining a predetermined number of words to be indicated on one line and a second line-change code for defining a segmental position of the words indicated on the line;

setting a first display mode when a display device is able to indicate the number of words defined by said first line-change code on the one line;

setting a second display mode when the display device is unable to indicate the number of words defined by said first line-change code on the one line; and controlling the display device in such a manner that the words defined by said first line-change code are indicated on the one line at said first display mode and that the line of the words defined by said first line-change code is changed to another line at the segmental position defined by said second line-change code at said second display mode.

* * * * *